Nov. 2, 1943.                T. A. BOWE                2,333,149
                 STEERING GEAR FOR WHEELED VEHICLES
                       Filed March 9, 1942
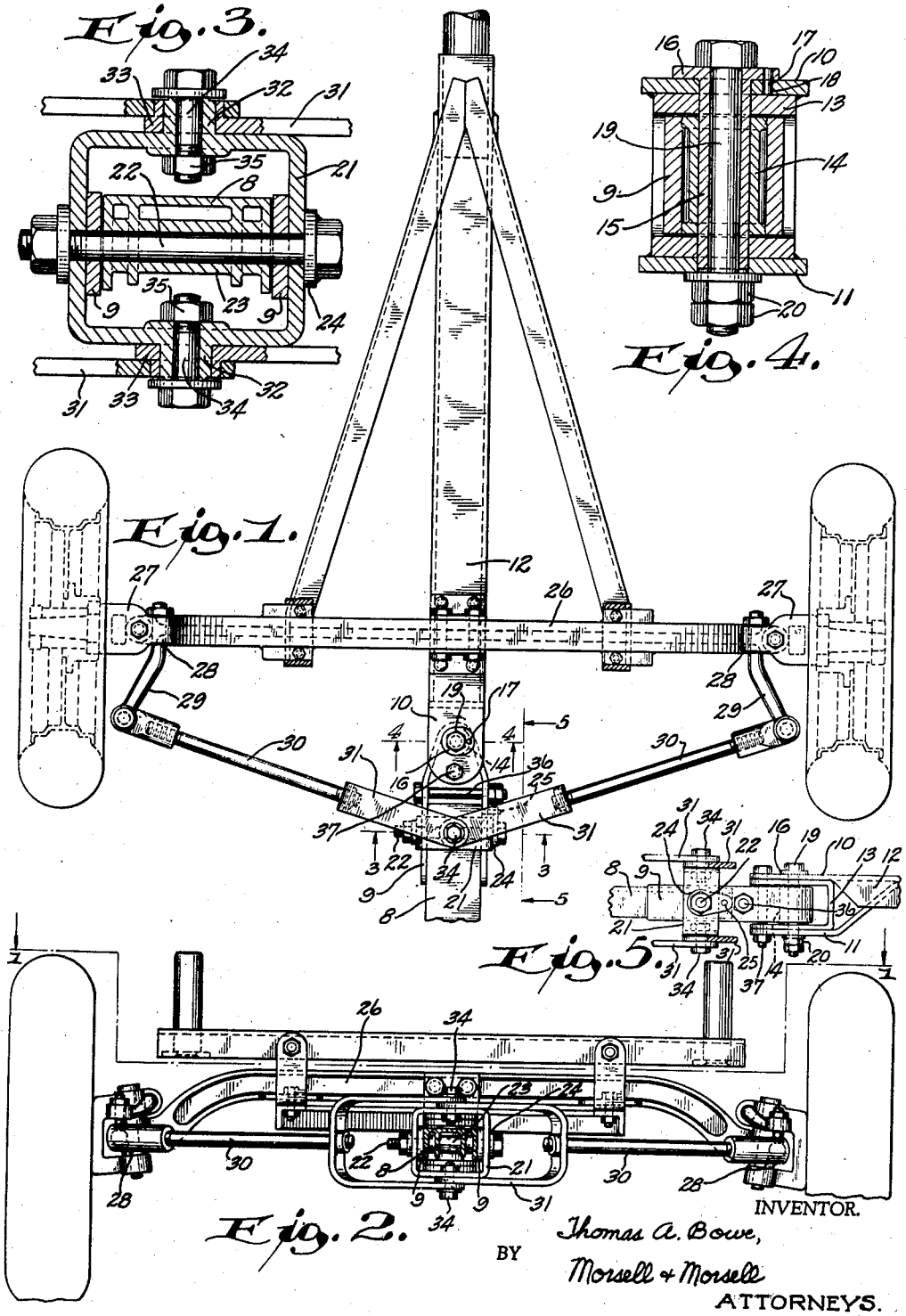
INVENTOR.
Thomas A. Bowe,
BY Morsell & Morsell
ATTORNEYS.

Patented Nov. 2, 1943

2,333,149

UNITED STATES PATENT OFFICE 2,333,149

STEERING GEAR FOR WHEELED VEHICLES

Thomas A. Bowe, Hilbert, Wis.

Application March 9, 1942, Serial No. 433,849

12 Claims. (Cl. 280—33.55)

This invention relates to improvements in steering gears for wheeled vehicles, and is particularly applicable to wheeled agricultural implements, trailers, and other types of vehicles having steerably mounted front wheels angularly turned by a forwardly extending steering pole and connection, which pole and connection is hitched to a tractor or other self-propelled towing vehicle.

A general object of the invention is to provide a farm implement, trailer, or wagon steering gear which is more simple, rigid and durable than the present types of steering gears for said implements and vehicles, and which will eliminate whipping as between the towed and towing vehicles, minimizing side sway of the towed vehicle.

A more specific object of the invention is to provide a wheeled vehicle steering gear in which the pivot pins for the overlapping inner ends of the steering rods are mounted in a manner so as to be extremely strong and rigid, providing very effective bearings, and eliminating undue wear on the strap extensions of said steering rods.

Still another specific object of the invention is to provide, in a wheeled vehicle steering gear including a pivotal steering pole, means for anchoring the bolt upon which the pole is mounted for movements in a vertical plane, said anchoring of the bolt preventing wear and strain on the surfaces of the engaging elements.

A further object of the invention is to provide, in a wheeled vehicle steering gear, a pivotal connection between the adjacent inner end portions of the vehicle steering pole and reach, said pivotal connection including a U-shaped strap with means engaging the latter to prevent it from spreading when strains are imposed on it during movements of the steering post, said means also cooperating in the formation of a stop to limit pivotal movements of the steering post.

A further object of the invention is to provide, in a wheeled vehicle steering gear, a main pivotal connection between adjacent inner end portions of the vehicle steering pole and reach, which connection includes a hardened steel pin, held against rotation, and a bearing therefor, whereby wear on the relatively movable elements is minimized.

A further object of the invention is to provide a wheeled vehicle steering gear wherein the inner ends of the steering rods carry U-shaped clevices, each of which embraces and is connected to the vehicle steering pole, said arrangement adding strength and rigidity to the structure and minimizing torsional strains and lost motion.

A further object of the invention is to provide a steering gear for wheeled trailer vehicles, which is of simple construction, is strong and durable, is inexpensive to manufacture, is efficient in operation, and is well adapted for the purposes described.

With the above and other objects in view the invention consists of the improved steering gear for wheeled vehicles, and its parts and combinations as set forth in the claims, and all equivalents thereof.

In the accompanying drawing in which the same reference characters indicate the same parts in all of the views:

Fig. 1 is a plan view, with portions in section, of the improved steering gear as applied to the front axle and forward end of a wheeled vehicle or implement of the trailer type, said view being indicated by line 1—1 in Fig. 2;

Fig. 2 is a front view of the vehicle chassis, front axle and steering gear with the steering pole in cross-section;

Fig. 3 is an enlarged, detail, sectional view taken on line 3—3 of Fig. 1;

Fig. 4 is an enlarged, detail, sectional view taken on line 4—4 of Fig. 1; and

Fig. 5 is a detail sectional view taken on line 5—5 of Fig. 1.

It will be apparent that the improved steering gear is applied to the front end structure of a trailer vehicle and is directly associated with the vehicle's wheel-carrying front axle and that the vehicle includes a reach and a forwardly extending steering pole, the latter being hitched to the rear end portion of a tractor or other vehicle which furnishes the motive power and does the towing. The trailer vehicle or implement to which the improved steering gear is applied has not been completely illustrated, the drawing disclosing only the front end portions of the elements with which the steering gear is directly associated. However, the vehicle to which the invention is applied is preferably a wheeled farm implement, wagon, or other form of trailer.

Referring now more particularly to the drawing it will appear that the steering pole of the wheeled trailer vehicle is indicated by the numeral 8. Said steering pole extends forwardly and its outer end is adapted to be hitched to the rear end portion of a tractor (not shown), a self-propelled towing vehicle, or an animal pulled vehicle. The inner end portion of the steering pole 8 has its side portions embraced by the side arm portions of a yoke 9. The closed end of said yoke 9, which is rearwardly tapered, extends beyond the inner end of the steering pole 8 and is positioned between upper and lower horizontal flanges 10 and 11 at the forward end of a wagon or vehicle reach 12. Welded or otherwise secured between the flanges 10 and 11, to reinforce the same, is a U-shaped member 13. The closed end portion of the yoke 9 has rigidly secured therewithin, or formed integral therewith, a spool 14. The spool is formed of metal and has a vertical bore therethrough of a substantial diameter. The bore of said spool 14 is adapted to receive the shank portion of a hardened steel pin 15. In the exemplification shown said pin is tubular and is formed with an enlarged head portion 16 overlying a portion of the flange 10. Said head portion 16 of the pin 15 carries a depending lug or protuberance 17 which seats in an aperture 18 therefore in the flange 10, whereby the steel pin 15 is prevented from rotating within the bore of the spool 14. A headed bolt 19 is extended through the tubular pin 15 and the lower end of said bolt carries nuts 20. It will thus be seen that the hardened steel pin 15 provides the main connection as between the adjacent inner end portions of the steering pole 8 and the reach 12. The pin 15 is maintained stationary so that the spool 14, integral with the closed end portion of the steering pole carried strap 9, turns or pivots on the pin 15. Said pin, being of hardened steel, effectively takes the wear.

The inner end of the steering pole 8 is provided with an encircling strap 21. Said strap is also exteriorily of the outer faces of the side arms of the embracing yoke 9. The inner end of the steering pole 8 is pivotally attached to the side arms of said yoke 9. This is accomplished by means of a horizontal bolt 22. The major portion of the shank of said bolt extends through a sleeve portion 23 in the inner end of the pole 8. The head of the bolt has welded thereto or formed integral therewith an eccentrically shaped plate 24 which carries an inwardly projecting pin or stud 25 seating in a recess in the yoke 9, whereby the bolt 22 is restrained from rotating. This anchorage of the bolt on which the parts turn eliminates wear on the metal surfaces and members engaged by the bolt.

It will be observed that the vehicle to which the improved steering gear is applied, includes a rigid front axle 26, to the opposite extremities of which are pivotally attached wheel carrying stub axles 27. The improved steering gear is adapted to effect simultaneous and uniform movement of the wheel carrying stub axles 27 which are equipped with the usual steering knuckles 28. The latter carry short steering arms 29 to the outer ends of which are pivotally and adjustably connected angularly directed steering rods 30. The outer end of each steering rod 30 has adjustably mounted thereon the closed end portion of a clevice 31. Said clevices, at their open ends, are sufficiently wide to embrace the band 21 and the pair of clevices 31 have the outer ends of their respective arms in overlapping relationship both on the upper and lower sides of the band 21. The manner in which the overlapped ends of the clevices are pivotally associated with the band 21 and hence with the steering pole 8 is best shown in the detailed sectional view in Fig. 3 of the drawing. It will be noted that medial upper and lower portions of the band 21 are formed with projecting boss portions 32 which are provided with bores. The boss portions 32 project through bushings 33 which are integral with the innermost arms of the clevices 31 and which extend into openings therefor in the overlapping arms of the clevices. Pivot pins 34 are extended through the openings in the bosses 32, said pivot pins having headed extremities and having the other extremities threaded and carrying nuts 35. The pivot pins 34, besides serving their main function of permitting the joined parts to pivot thereon, connect the ends of the clevices to the band 21.

By the provision of U-shaped clevices at the ends of the steerng rods 30, pivotal connections are made with the steering pole both adjacent the upper and lower surfaces thereof, dividing the strains and stresses, minimizing wear, and providing additional and substantial bearing surfaces. The clevices 31 are preferably formed of spring steel to give resiliency and additional strength.

Intermediate side portions of the yoke 9, beyond the extremity of the steering pole 8, are connected by a transverse horizontal bolt 36. This bolt normally functions to prevent spreading of the opposite sides of the yoke 9 when strain is imposed thereon due to movements of the steering pole 8 horizontally. There is also a vertically disposed bolt 37 connecting the free ends of the flanged portions 10 and 11 of the reach 12. The vertical bolt 37 is positioned so that it will be engaged by the side portions of the projecting end of the yoke 9 and thereby form a stop to limit turning movements of the steering pole 8 in either direction horizontally. At such times as the bolt 37 acts as a stop, in contacting with the sides of the yoke 9 there is of course an outward force imposed against that portion of the yoke which contacts with the bolt 37. During these periods the horizontal bolt 36 becomes effective to prevent outward bowing of the yoke and to relieve strain thereon.

Inasmuch as the forward end of the reach 12 is of recessed formation, by virtue of the space between the flanges 10 and 11 and the inset U-member 13, it will be evident that if no provisions were made to guard thereagainst, during up and down pivotal movements of the steering pole 8, strains in a vertical direction would be imposed against the horizontal flanges 10 and 11 of the reach, which might tend to spread the same. The vertical bolt 37 guards against this contingency.

The improved steering gear provides for a massive structure encircling the end portion of the steering pole adjacent its connection with the vehicle reach, and this distributes strains and stresses. The U-shaped clevices 31 in their end-overlapping relationship add to the strength and rigidity of the assembly and minimize torsional strains and lost motion relative to the steering arms during sidewise movements of the steering pole.

All of the points at which pivotal connections are effected in the steering mechanism are reinforced and very adequate hard and wear-proof bearing surfaces are provided. Parts of the structure which might ordinarily be subjected to bowing and deflection are suitably reinforced. Due to the rigidity of the mechanism and the elimination of play and lost motion, the trailer vehicle will be towed in a very stable condition with a minimum of whipping and side sway as between the towed and the towing vehicles. The improved steering gear is furthermore of simple and novel construction and is well adapted for the purposes set forth.

What is claimed as the invention is:

1. A steering gear, comprising a vehicle chassis including a central reach, wheel carrying axle members pivotally associated with forward portions of the chassis, a steering pole pivotally connected at one end to a forward end portion of the reach, a pair of angularly related steering rods pivotally associated at opposite ends with said axle members, a U-shaped member mounted on the other end of each rod, the free end portions of the arms of each U-member extending over opposite faces of the steering pole, and pivot pins joining the respective arms of a U-member with those of the other U-member in overlapping relationship and connecting the same directly to opposed top and bottom portions of the steering pole to hold the steering pole rigidly against torsional movements.

2. A steering gear, comprising a vehicle chassis including a central reach, wheel carrying axle members pivotally associated with forward portions of the chassis, a steering pole having an articulated inner end section, means pivotally connecting the extremity thereof to the forward end portion of the reach, a band surrounding the articulated end portion of the steering pole, a pair of angularly related steering rods pivotally associated at opposite ends with said axle members, a U-shaped member having its closed end mounted on the other end of each rod, the free end portions of the arms of each U-member extending over opposite faces of said band, and pivot pins joining the respective arms of a U-member with those of the other U-member in overlapping relationship and connecting the same to face portions of the band.

3. A steering gear, comprising a vehicle chassis including a central reach, wheel carrying axle members pivotally associated with forward portions of the chassis, a steering pole having an articulated inner end section, the articulated portions of the steering pole being relatively movable in a vertical plane, means pivotally connecting the extremity of the steering pole to the forward end portion of the reach for horizontal turning movements, a band surrounding the articulated end portion of the steering pole, a pair of angularly related steering rods pivotally associated at opposite ends with said axle members, a U-shaped member having its closed end mounted on the other end of each rod, the free end portions of the arms of each U-member extending over opposite faces of said band, and pivot pins joining the respective arms of a U-member with those of the other U-member in overlapping relationship and connecting the same to face portions of the band.

4. A steering gear, comprising a vehicle chassis including a central reach, wheel carrying axle members pivotally associated with forward portions of the chassis, a steering pole having its inner end formed with a horizontal hardened bushing, a clevice having its closed end engaging the forward end of the reach and having the side arm portions embracing sides of the inner end of the steering pole, means pivotally connecting the closed end of the clevice to the forward end portion of the reach, a band surrounding the inner end portion of the steering pole and the clevice side arms, a pivot pin passing through the sides of the band, the side arms of the clevice, and the steering pole bushing, a pair of angularly related steering rods pivotally associated at opposite ends with said axle members, a U-shaped member having its closed end mounted on the other end of each rod, the free end portions of the arms of each U-member extending over opposite faces of said band, and pivot pins joining the respective arms of a U-member with those of the other U-member in overlapping relationship and connecting the same to face portions of the band.

5. A steering gear, comprising a vehicle chassis including a central reach, the forward end portion of the reach having spaced horizontal flanges, wheel carrying axle members pivotally associated with forward portions of the chassis, a steering pole having an articulated inner end section, the articulated portions of the steering pole being relatively movable in a vertical plane, the extremity of the articulated portion of the steering pole extending between the spaced flanges of the reach, means pivotally connecting said extremity of the steering pole to said flanges of the reach for horizontal turning movements, a pair of angularly related steering rods pivotally associated at opposite ends with said axle members, the other end portions of the rods extending over face portions of the steering pole, and pivot members joining said ends of the arms in overlapping relationship and connecting the same to the steering pole.

6. A steering gear, comprising a vehicle chassis including a central reach, the forward end portion of the reach having spaced horizontal flanges, wheel carrying axle members pivotally associated with forward portions of the chassis, a steering pole having an articulated inner end section, the articulated portions of the steering pole being relatively movable in a vertical plane, the extremity of the articulated portion of the steering pole extending between the spaced flanges of the reach, means pivotally connecting said extremity of the steering pole to said flanges of the reach for horizontal turning movements, complementary means carried by adjacent portions of the steering pole and reach for limiting relative turning movements of the same, a pair of angularly related steering rods pivotally associated at opposite ends with said axle members, the other end portions of the rods extending over face portions of the steering pole, and pivot members joining said ends of the arms in overlapping relationship and connecting the same to the steering pole.

7. A steering gear, comprising a vehicle chassis including a central reach, wheel carrying axle members pivotally associated with forward portions of the chassis, a steering pole, a clevice having side arms embracing side portions of the inner end of the steering pole and having its closed end extending beyond said end of the steering pole, a bushing formed in the closed end portion of the clevice, a vertical pivot mechanism connecting the closed end of the clevice with the adjacent end of the reach and extending through said bushing, a pair of angularly related steering rods pivotally associated at opposite ends with said axle members, the other end portions of the rods extending over face portions of the steering pole, and pivot members joining said ends of the arms in overlapping relationship and connecting the same to the steering pole.

8. A steering gear, comprising a vehicle chassis including a central reach, wheel carrying axle members pivotally associated with forward portions of the chassis, a steering pole, a clevice having side arms embracing side portions of the inner end of the steering pole and having its closed end extending beyond said end of the steering pole, a bushing formed in the closed end portion of the clevice, a vertical pivot mechanism connecting the closed end of the clevice with the adjacent end of the reach and extending through said bushing, said pivot mechanism including a hardened steel pin and means anchoring the pin to the reach against turning movement, a pair of angularly related steering rods pivotally associated at opposite ends with said axle members, the other end portions of the rods extending over face portions of the steering pole, and pivot members joining said ends of the arms in overlapping relationship and connecting the same to the steering pole.

9. A steering gear, comprising a vehicle chassis including a central reach, the forward end portion of the reach having spaced horizontal flanges, wheel carrying axle members pivotally associated with forward portions of the chassis, a steering pole having its inner end formed with a horizontal hardened bushing, a clevice having its closed end extending between the spaced flanges of the reach and having the side arm portions embracing sides of the inner end of the steering pole, a vertical bushing fast within the closed end of the clevice, means pivotally connecting the closed end of the clevice within the flanged portion of the reach, including a pin extending through said bushing and the reach flanges and anchored to the latter, a band surrounding the inner end portion of the steering pole and the clevice side arms, a pivot pin passing through the sides of the band, the side arms of the clevice, and the steering pole bushing, a pair of angularly related steering rods pivotally associated at opposite ends with said axle members, a U-shaped member having its closed end mounted on the other end of each rod, the free end portions of the arms of each U-member extending over opposite faces of said band, and pivot pins joining the respective arms of a U-member with those of the other U-member in overlapping relationship and connecting the same to face portions of the band.

10. A steering gear, comprising a vehicle chassis including a central reach, the forward end portion of the reach having spaced horizontal flanges, wheel carrying axle members pivotally associated with forward portions of the chassis, a steering pole having its inner end formed with a horizontal hardened bushing, a clevice having its closed end extending between the spaced flanges of the reach and having its side arm portions embracing sides of the inner end of the steering pole, a vertical bushing fast within the closed end of the clevice, a pivot pin extending through the reach flanges and the last mentioned bushing and anchored to said flanges, a tie between the outer ends of said flanges, a tie between spaced arm portions of the clevice beyond the steering pole, said ties preventing spreading of their respective members and cooperating to form stop means to limit horizontal turning movements between the steering pole and reach, a band surrounding the inner end portion of the steering pole and the clevice side arms, a pivot pin passing through the sides of the band, the side arms of the clevice, and the steering pole bushing, means for anchoring said pivot pin against turning, a pair of angularly related steering rods operatively associated at their outer ends with said axle members, a U-shaped member having its closed end mounted on the other end of each rod, the free end portions of the arms of each U-member extending over opposite faces of said band, and pivot pins joining the respective arms of a U-member with those of the other U-member in overlapping relationship and connecting the same to face portions of the band.

11. A steering gear, comprising a vehicle chassis including a central reach, wheel carrying axle members pivotally associated with forward portions of the chassis, a steering pole having its inner end formed with a horizontal hardened bushing, a clevice having its closed end engaging the forward end of the reach and having the side arm portions embracing sides of the inner end of the steering pole, means pivotally connecting the closed end of the clevice to the forward end portion of the reach, a band surrounding the inner end portion of the steering pole and the clevice side arms, opposite portions of the upper and lower faces of the band having outwardly extending bored boss portions, a pivot pin passing through the sides of the band, the side arms of the clevice, and the steering pole bushing, a pair of angularly related steering rods pivotally associated at opposite ends with said axle members, a U-shaped member having its closed end mounted on the other end of each rod, the free end portions of the arms of each U-member extending over top and bottom faces of said band with the arms of one U-member overlapping the arms of the other U-member, said overlapping arm portions being provided with bores, the overlapped portions of the arms of the other U-member having outwardly directed bored bosses extending through the bores in said overlapping arms and receiving the boss portions on said band, and pivot pins extending through the bores of said band bosses.

12. A steering gear comprising a vehicle chassis including a central reach, wheel carrying axle members pivotally associated with forward portions of the chassis, a steering pole having its inner end formed with a horizontal hardened bushing, a clevice having its closed end engaging the forward end of the reach and having the side arm portions embracing sides of the inner end of the steering pole, means pivotally connecting the closed end of the clevice to the forward end portion of the reach, a pivot pin connecting the side arms of the clevice to the steering pole, a pair of angularly related steering rods pivotally associated at opposite ends with said axle members, and means pivotally connecting the other end portions of the steering rods with the inner end portion of the steering pole.

THOMAS A. BOWE.